US008429565B2

(12) United States Patent
Agarawala et al.

(10) Patent No.: US 8,429,565 B2
(45) Date of Patent: Apr. 23, 2013

(54) DIRECT MANIPULATION GESTURES

(75) Inventors: Anand Agarawala, San Francisco, CA (US); Patrick Dubroy, San Francisco, CA (US); Adam Lesinski, Mississauga (CA)

(73) Assignee: Google Inc., Mountain View, CA (US)

( * ) Notice: Subject to any disclaimer, the term of this patent is extended or adjusted under 35 U.S.C. 154(b) by 346 days.

(21) Appl. No.: 12/868,398

(22) Filed: Aug. 25, 2010

(65) Prior Publication Data

US 2011/0055773 A1 Mar. 3, 2011

Related U.S. Application Data

(60) Provisional application No. 61/236,634, filed on Aug. 25, 2009.

(51) Int. Cl.
*G06F 3/01* (2006.01)
*G06F 3/048* (2006.01)
(52) U.S. Cl.
USPC ........... 715/863; 715/835; 715/701; 715/702; 715/765
(58) Field of Classification Search ............... 715/700, 715/701, 702, 764, 765, 835, 863; 345/173
See application file for complete search history.

(56) References Cited

U.S. PATENT DOCUMENTS

| | | | |
|---|---|---|---|
| 5,835,094 A | 11/1998 | Ermel et al. | |
| 5,896,133 A | 4/1999 | Lynch et al. | |
| 5,917,490 A | 6/1999 | Kuzunuki et al. | |
| 6,243,724 B1 | 6/2001 | Mander et al. | |
| 6,529,210 B1 | 3/2003 | Rees | |
| 6,590,593 B1 | 7/2003 | Robertson et al. | |
| 6,608,628 B1 | 8/2003 | Ross et al. | |
| 6,618,063 B1 | 9/2003 | Kurtenbach | |
| 7,456,823 B2 * | 11/2008 | Poupyrev et al. | 345/173 |
| 7,509,588 B2 | 3/2009 | Van Os et al. | |
| 7,532,196 B2 | 5/2009 | Hinckley | |
| 8,181,122 B2 * | 5/2012 | Davidson | 715/863 |
| 2003/0074424 A1 | 4/2003 | Giles et al. | |

(Continued)

FOREIGN PATENT DOCUMENTS

WO 2007121557 A1 11/2007

OTHER PUBLICATIONS

Office Action from U.S. Appl. No. 12/293,198, dated Jul. 6, 2011, 18 pp.

(Continued)

*Primary Examiner* — Xiomar L Bautista
(74) *Attorney, Agent, or Firm* — Shumaker & Sieffert, P.A.

(57) ABSTRACT

The present disclosure describes various techniques that may be implemented to execute and/or interpret manipulation gestures performed by a user on a multipoint touch input interface of a computing device. An example method includes receiving a multipoint touch gesture at a multipoint touch input interface of a computing device, wherein the multipoint touch gesture comprises a gesture that is performed with multiple touches on the multipoint touch input interface, and resolving the multipoint touch gesture into a command. The example method further includes determining at least one physical simulation effect to associate with the resolved multipoint touch gesture, and rendering a unified feedback output action in a graphical user interface of the computing device by executing the command, wherein the unified feedback output action includes at least a graphical output action incorporated with the at least one physical simulation effect in the graphical user interface.

24 Claims, 9 Drawing Sheets

U.S. PATENT DOCUMENTS

| | | | |
|---|---|---|---|
| 2004/0021643 | A1 | 2/2004 | Hoshino et al. |
| 2004/0117727 | A1 | 6/2004 | Wada |
| 2005/0154991 | A1 | 7/2005 | Jaeger |
| 2006/0085767 | A1 | 4/2006 | Hinckley et al. |
| 2007/0064004 | A1 | 3/2007 | Bonner et al. |
| 2007/0146347 | A1 | 6/2007 | Rosenberg |
| 2007/0192692 | A1* | 8/2007 | Chen et al. .............. 715/702 |
| 2008/0168382 | A1 | 7/2008 | Louch et al. |
| 2008/0168402 | A1 | 7/2008 | Blumenberg |
| 2008/0168403 | A1 | 7/2008 | Westerman et al. |
| 2008/0309632 | A1 | 12/2008 | Westerman et al. |
| 2009/0070705 | A1 | 3/2009 | Ording |
| 2009/0122018 | A1 | 5/2009 | Vymenets et al. |
| 2009/0228841 | A1 | 9/2009 | Hildreth |
| 2009/0307623 | A1 | 12/2009 | Agarawala et al. |
| 2010/0079405 | A1 | 4/2010 | Bernstein |
| 2010/0211920 | A1* | 8/2010 | Westerman et al. ......... 715/863 |
| 2011/0279397 | A1* | 11/2011 | Rimon et al. .............. 345/173 |

OTHER PUBLICATIONS

Response to Office Action dated Jul. 6, 2011, from U.S. Appl. No. 12/293,198, filed Oct. 7, 2011, 13 pp.

Wikipedia entry: Microsoft Bob, found at http://en.wikipedia.org/w/index.php?title=Microsoft_Bob&oldid=48873217, Apr. 17, 2006, 2 pp.

Wikipedia entry: Magic Cap, found at http://en.wikipedia.org/w/index.php?title=Magic_Cap&oldid=46961398, Apr. 4, 2006, 1 p.

Atwood, Coding Horror—programming and human factors, found at a. http://en.wikipedia.org/wiki/File: Magic_Cap_OS. gif#filehistory, May 25, 2006, 12 pp.

Microsoft® Bob™ version 1 for windows®, found at http://web.archive.org/web120060206205347/http://www.telecommander. com/pics/links/application%20software/microsoft/Microsoft_Bob_1_0/Microsoft_Bob_1_0.htm, Feb. 6, 2006, 2 pp.

Office Action from U.S. Appl. No. 12/293,198, dated Jun. 1, 2012, 19 pp.

Response to Office Action dated Jun. 1, 2012, from U.S. Appl. No. 12/293,198 filed Aug. 31, 2012, 12 pp.

International Preliminary Report on Patentability from international application No. PCT/US2010/046688, dated Mar. 8, 2012, 8 pp.

Resco Photo Viewer for S60, User Manual for v5.0, accessed on Jun. 17, 2010, 18pp. http://www.resco.net/symbian/downloads/RescoViewerS60.pdf.

Wu et al., "Multi-Finger and Whole Hand Gestural Interaction Techniques for Multi-user Tabletop Displays," Proceedings of the 16th Annual ACM Symposium on User Interface Software and Technology: Vancouver, Canada, Nov. 2-5, 2003; [ACM Symposium on User Interface Software and Technology], New York, NY; ACM Press, vol. 5, No. 2, Nov. 2, 2003, pp. 193-202, 10 pp.

International Search Report and Written Opinion of corresponding application No. PCT/US2010/046688, mailed Dec. 22, 2010, 11 pp.

International Search Report and Written Opinion of application No. PCT/CA2007/000637, mailed Aug. 16, 2007, 9 pp.

Office Action from U.S. Appl. No. 12/293,198, dated Nov. 10, 2011, 24 pp.

Response to Office Action dated Nov. 10, 2011, from U.S. Appl. No. 12/293,198, filed Jan. 9, 2012, 14 pp.

Extended Search Report from EP Application No. 07719564.2, dated Oct. 24, 2012, 7 pgs.

Notice of Allowance from U.S. Appl. No. 12/293,198, dated Oct. 16, 2012, 17 pp.

Response to Office Action dated Apr. 3, 2012, from European Patent Application No. 10760814.3, filed Oct. 10, 2012, 17 pp.

* cited by examiner

DIRECT MANIPULATION GESTURES

This application claims the benefit of U.S. Provisional Application No. 61/236,634, filed Aug. 25, 2009, the entire content of which is incorporated herein by reference.

TECHNICAL FIELD

The present disclosure relates manipulation gestures performed by a user on a multipoint touch input interface of a computing device.

BACKGROUND

With the proliferation of computing devices and software programs to view, manipulate and manage information presented via a graphical user interface, there has been an increased desire to provide a user with more intuitive and realistic ways of interaction. For instance, with regard to entering commands and as well for providing feedback on the objects acted on, as the entered commands are carried out to completion. The graphical user interface objects displayed and manipulated may include such images as icons, text, menus, windows and digital photographs, for example. Touch sensitive devices have been developed to receive touch-based gestures as user input to computer systems, as implemented in touch screen or touchpad input devices.

SUMMARY

The present disclosure describes various techniques that may be implemented to execute and/or interpret manipulation gestures performed by a user on a multipoint touch input interface of a computing device. To enhance the user experience, user feedback based on physical simulation related one or more gestures is incorporated with the customary graphical output for presentation in a manner that may be intuitive and realistic to the user.

In one example, a method comprises the following: receiving a multipoint touch gesture at a multipoint touch input interface of a computing device, wherein the multipoint touch gesture comprises a gesture that is performed with multiple touches on the multipoint touch input interface; resolving the multipoint touch gesture into a command; determining at least one physical simulation effect to associate with the resolved multipoint touch gesture; and rendering a unified feedback output action in a graphical user interface of the computing device by executing the command, wherein the unified feedback output action includes at least a graphical output action incorporated with the at least one physical simulation effect in the graphical user interface.

In one example, a computer-readable storage medium comprises instructions that, when executed, cause one or more processors of a computing device to: receive a multipoint touch gesture at a multipoint touch input interface of the computing device, wherein the multipoint touch gesture comprises a gesture that is performed with multiple touches on the multipoint touch input interface; resolve the multipoint touch gesture into a command; determine at least one physical simulation effect to associate with the resolved multipoint touch gesture; and render a unified feedback output action in a graphical user interface of the computing device by executing the command, wherein the unified feedback output action includes at least a graphical output action incorporated with the at least one physical simulation effect in the graphical user interface.

In one example, a computing device comprises a multipoint touch input interface, a processor, a gesture resolution module, and a physical simulation module. The multipoint touch input interface is configured to receive a multipoint touch gesture, wherein the multipoint touch gesture comprises a gesture that is performed with multiple touches on the multipoint touch input interface. The gesture resolution module is implemented by the processor to resolve the received multipoint touch gesture. The physical simulation module is implemented by the processor to determine at least one physical simulation effect to associate with the resolved multipoint touch gesture. The computing device further comprises means for rendering unified feedback output action in a graphical user interface of the computing device, wherein the unified feedback action includes at least a graphical output action incorporated with the associated at least one physical simulation effect in the graphical user interface.

BRIEF DESCRIPTION OF THE DRAWINGS

Embodiments are illustrated by way of example only and not limitation, with reference to the following drawings in which like reference numerals indicate corresponding or similar elements, and in which.

DETAILED DESCRIPTION

There continues to be a trend in the field of human-computer interaction to take advantage of the fact that humans respond more favourably to environments that mimic reality as closely as possible. Accordingly, in carrying out a gesture-initiated command by a user at a user interface of a computing system, feedback may be provided to a user in a more intuitive and realistic manner. The user experience will be much enhanced and more positive to the extent that a user interface is more intuitive, and the feedback that it provides to the user is richer, more realistic and more intuitive.

Figure 1:
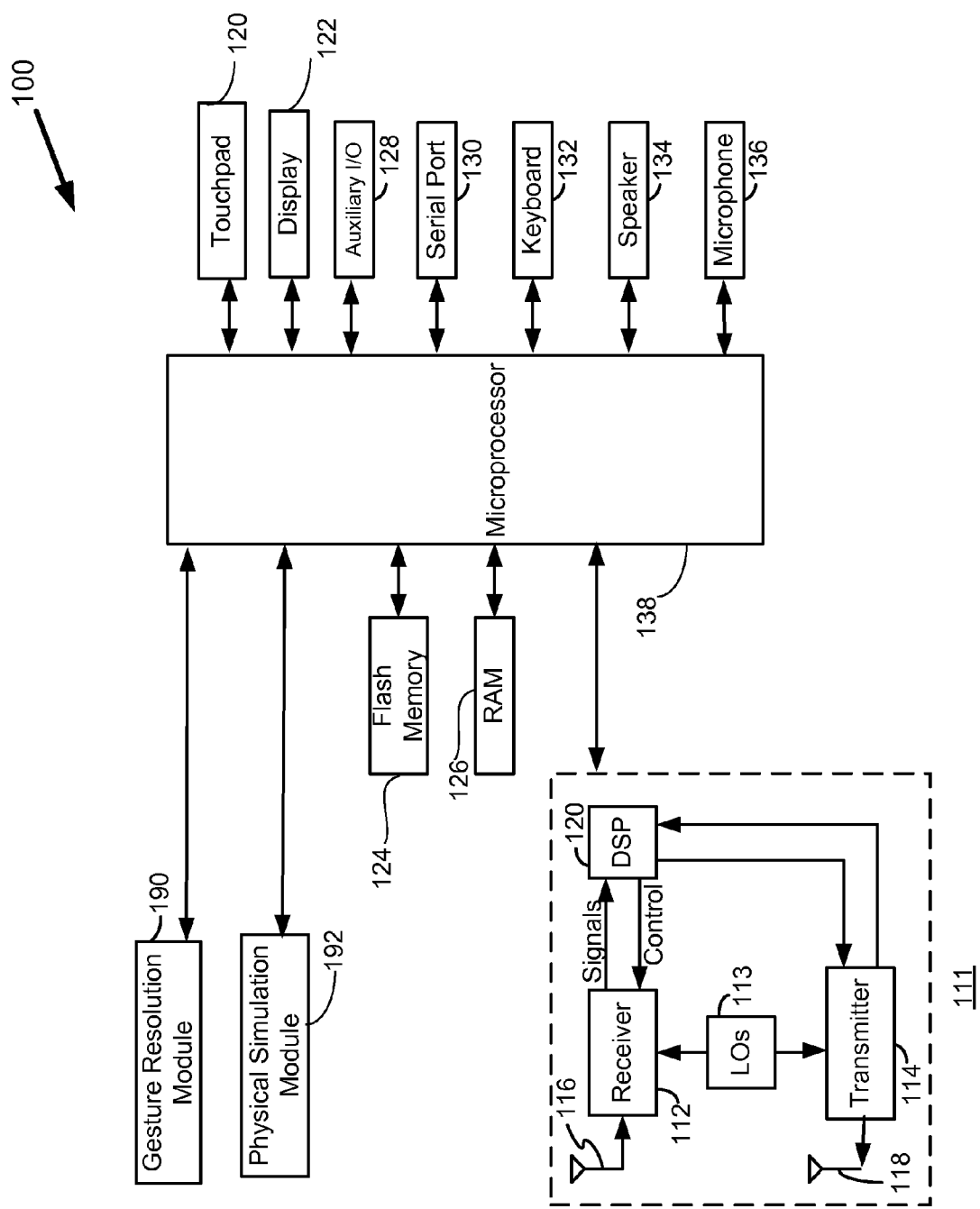
FIG. 1 is an exemplary block diagram illustrating a computing device enabled for multipoint touch input capability in accordance with one embodiment.

Referring to FIG. 1, components of the computing device 100 are illustrated in greater detail. The computing device 100 may be a laptop computer, a desktop computer, a handheld computer or other data computing device.

The computing device 100 includes a microprocessor 138 which controls general operation of the computing device 100. The microprocessor 138 also interacts with additional device subsystems such as a display 122, a flash memory 124, a random access memory (RAM) 126, auxiliary input/output (I/O) subsystems 128, a serial port 130, a keyboard 132, a speaker 134, a microphone 136, and a short-range communications subsystem 140 such as Bluetooth™ for example. Operating system software used by the microprocessor 138 may be stored in a persistent store of memory such as the flash memory 124, which may alternatively be a read-only memory (ROM) or similar storage element (not shown). Those skilled in the art will appreciate that the operating system, specific device applications, or parts thereof, may be temporarily loaded into a volatile store of memory such as RAM 126.

The microprocessor 138, in addition to its operating system functions, typically enables execution of software applications on the computing device 100. A predetermined set of applications, which control basic device operations, may be installed on the computing device 100 during its manufacture. Applications may also be loaded onto the computing device 100 through an auxiliary I/O subsystem 128 or serial port 130 and installed by a user in RAM 126, or the in flash memory-type persistent store 124, for execution by the microprocessor 138. Such flexibility in application installation increases the functionality of the computing device 100 and may provide enhanced on-device features.

The display screen 122 is used to visually present an application's graphical user interface (GUI) to the user. The user can manipulate application data by modifying information on the GUI using an input device such as the keyboard 132 for example. Depending on the type of computing device 100, the user may be provided with other types of input devices, such as, for example, a scroll wheel, trackball, or light pen.

The display screen 122 of computing device 100 may also be configured as a multipoint touch input interface by incorporating touch-sensing means based on sensing technologies into display screen 122. The sensing technologies may be capacitive sensing, resistive sensing, surface acoustic wave sensing, pressure sensing, optical sensing, and the like. The touch sensing means may be multipoint touch sensing means, capable of distinguishing multiple touches that occur at the same time.

User interface commands or instructions, performed by way of multipoint gestures, directly performed by a user at display screen 122 of computing device 100 for example, are gestures that can be performed with multiple points. That is, the gesture is performed with coordinated multiple touches from multiple fingers, fingers, palms and/or side of the hand, a finger and a stylus, or any combination thereof. The multipoint gesture may be dynamic, involving motion. The touch sensing means reports the touches to the processor 138, which in conjunction with gesture resolution module 190, interprets or resolves the touches based on its programming. Processor 138 of computing device 100 may be configured to immediately recognize an in-progress gesture so that an action associated with the gestures can be implemented simultaneously with the gesture.

For instance, in carrying out a user interface command comprising the pile fan-out gesture or the scrunch gesture (which are described in more detail below) the objects selected and acted on by the gesture move immediately and simultaneously along with the finger motion. During such an operation, the processor 138 of computing device recognizes the multipoint touch input as a multipoint gesture, and after resolution of the multipoint gesture into a command or instruction, in conjunction with gesture resolution module 190, determines what output action should be performed based, at least partly, on physical simulation module 192, and renders the appropriate graphical output on the display screen 122.

Touchpad 120 may alternately, or additionally with display screen 122 described above, comprise the multipoint touch input interface of the computing device 100. Here, touchpad 120 may include similar touch sensing means as described above for display screen 122 to receive input from a user's multipoint touch for processing at processor 138.

The multipoint touch gesture input applied to display screen 122 or touchpad 120 may comprise one or more successive single gestures or multiple gestures that occur simultaneously. Each of the gestures generally may have a particular sequence, motion, or orientation associated therewith, such as, but not limited to, spreading the fingers apart or closing the fingers together, rotating the fingers, translating the fingers. Additional gesture motions may be performed similarly on display screen 122 or touchpad 120 using the flat edge of a user's palm or side of the hand, in lieu of or in addition to, the fingers.

Gesture resolution module 190 interprets or resolves the user touches reported to processor 138 by the touch sensing means of display screen 122 and/or touchpad 120. The display screen 122 and/or touchpad 120 receives the gesture input, and after resolution of the gesture by gesture resolution module 190, the processor 138 executes commands or instructions to render output actions in response to respective gestures. The output actions rendered may include, but are not limited to, graphical output actions such as moving or changing the spatial relation among the icons or objects displayed on the GUI of display screen 122.

Gesture resolution module 190 may be part of the operating system of computing device 100, or a separate application, implemented in software and/or firmware instructions. Gesture resolution module 190 generally includes a set of instructions that recognizes the occurrence of the multipoint touch gesture and in conjunction with processor 138, interprets or resolves the gesture. The gestures may be resolved, for example, into commands or instructions for performing actions on applications stored in memory, such as in, but not limited to, RAM 128 or flash memory 124 of computing device 100, modifying objects shown as icons on the display screen 122, expanding piled documents displayed on a GUI for better viewing, or collating a pile of documents scattered over the GUI of display screen 122 into a single pile or folder.

As the multipoint touch gesture command is performed, modifications simultaneously occur to the objects located underneath the gesture. For example, during the pile fan-out, the user's fingers may move across the display screen 122 in order to cause the objects shown thereon to fan out or spread out during the spreading. Likewise, during a scrunch gesture, the user's fingers may close together in order to gather the objects shown on display screen 122 during the closing of the user's fingers. During this operation, the computing system 100 recognizes the user input as a pile fan-out or a scrunch gesture respectively, determines what action should be taken, and outputs control data to the display screen device 122.

Physical simulation module 192, once the gesture is resolved into a command or instruction, may optionally be used to determine an appropriate physical effect to associate with the resolved gesture. Physical simulation module 192 may be part of the operating system of computing device 100, or a separate application, implemented in software and/or firmware instructions. Physical simulation module 192 generally includes a set of instructions that, in conjunction with processor 138, and according to a set of pre-determined rules, optionally associates an appropriate physical effect with a given multipoint gesture or combination of gestures. Once the physical effect is associated with the resolved gesture, the command or instruction being carried out is rendered, incorporated with the physical effect, in the GUI, thereby providing a unified and intuitive feedback output action.

A physical effect that may be applied by physical simulation module 192 may include a magnetic force, a friction or dampening force, a centrifugal force, a speed, acceleration, a vibration force, mass, weight, brightened or dimmed levels of light, or audio. For example, an object being dropped and in free fall may have gravitational acceleration motion applied by simulating that physical effect. A subject item being moved towards, or into, a target item may have a frictional forces simulated, to counteract the motion and provide a physical effect associated with being pushed along a surface towards the target item. A subject item entering into the proximity of another target or intermediary item may have a magnetic force simulated, either attraction or repulsion.

Spatial attributes of the user interface subject or target items, such as size, weight, mass or location, may be taken into account in simulating the physical effects. A user action may performed to have a subject item, such as a file icon, follow a curved path towards a target item, rather than a linear path, in which case a centrifugal force with a frictional force may be applied to influence the subject item's progress towards the target item. Simulating such physical effects, associating and incorporating them into the customary graphical output of the command being performed such as showing a selected file icon being moved towards a file folder across the display screen 120, for instance, contribute to an enhanced level of intuitive feedback perceived by a user, as users are inherently and intuitively familiar with such realistic physical effects. Relationships among the physical variables inherent in simulating the physical effects are known in the mechanical and physical arts, and may be expressed in the appropriate equations used to simulate a given physical effect via physical simulation module 192.

Pre-determined rules for determining one or more appropriate physical effect(s) for a given gesture may be provided at physical simulation module 192 of computing device 100. The set of pre-determined rules used in physical simulation module 192 to determine an appropriate physical effect may comprise, for example, applying a friction force whenever motion of a subject item, such as, but not limited to, a file icon, is selected for movement into, or towards, a target item. More than one physical effect may be combined, associated, and then applied with the graphical output action. For instance, more than a single force effect may be applied. In yet another instance, combining increasing or decreasing audio levels, for rendering via speaker 134 of computing device 100, simultaneously with the force effects and the graphical output action, to create the unified feedback output action, such that the user of computing device 100 may experience an enhanced, realistic feel associated with the customary graphical output action that is visually performed on the display screen 122.

The computing device 100 may optionally include a communication subsystem 111, which includes a receiver 112, a transmitter 114, and associated components, such as one or more embedded or internal antenna elements 116 and 118, local oscillators (LOs) 113, and a processing module such as a digital signal processor (DSP) 120. The particular design of the communication subsystem 111 may depend on the communication network in which computing device 100 is intended to operate.

Figure 2:
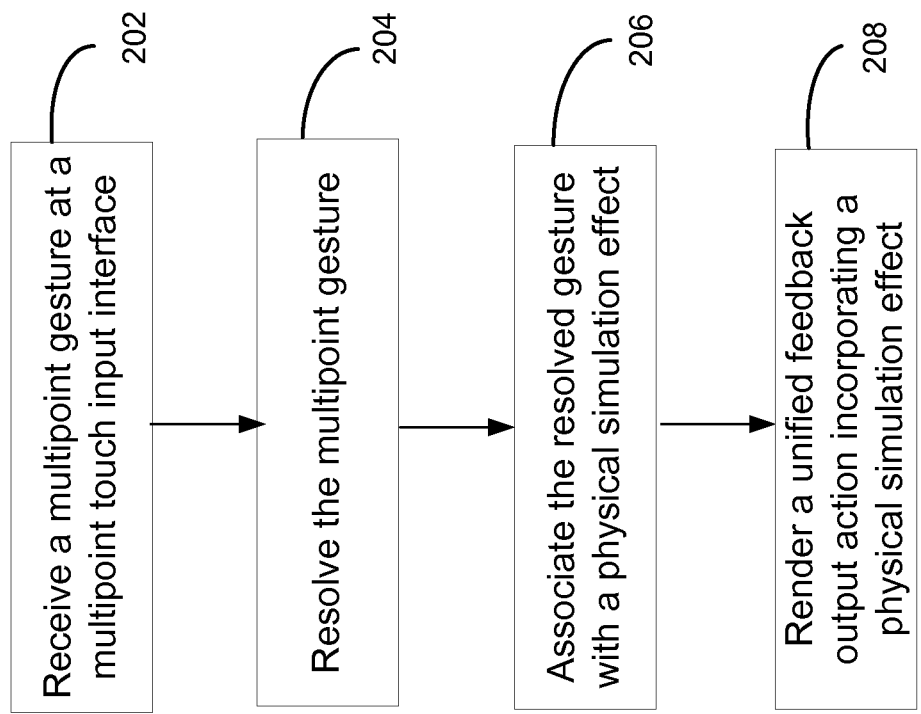
FIG. 2 is a flowchart illustrating an exemplary sequence of operations based on the block diagram elements depicted in FIG. 1.

FIG. 2 is an exemplary sequence of acts for associating a physical simulation effect with a multipoint gesture to render a unified, intuitive feedback output action. The process of FIG. 2 may be implemented by any computing device, such as computing device 100.

The example process of FIG. 2 includes receiving a multipoint touch gesture at a multipoint touch input interface of a computing device, wherein the multipoint touch gesture comprises a gesture that is performed with multiple touches on the multipoint touch input interface (202). The process further includes resolving the multipoint touch gesture into a command (204), and associating the resolved multipoint touch gesture with at least one physical simulation effect (206). The process further includes rendering a unified feedback output action in a graphical user interface of the computing device by executing the command, wherein the unified feedback output action includes at least a graphical output action incorporated with the at least one physical simulation effect in the graphical user interface (208).

The acts described in FIG. 2 will now be described further as applied to some exemplary specific multipoint gesture inputs. In FIG. 2 and all subsequent figures though FIGS. 9*a-b* of the disclosure herein, it will be understood that the multipoint gesture actions depicted are being undertaken on a multipoint touch input interface, such as touchpad 120 or display screen 122 described above.

Figure 3A:
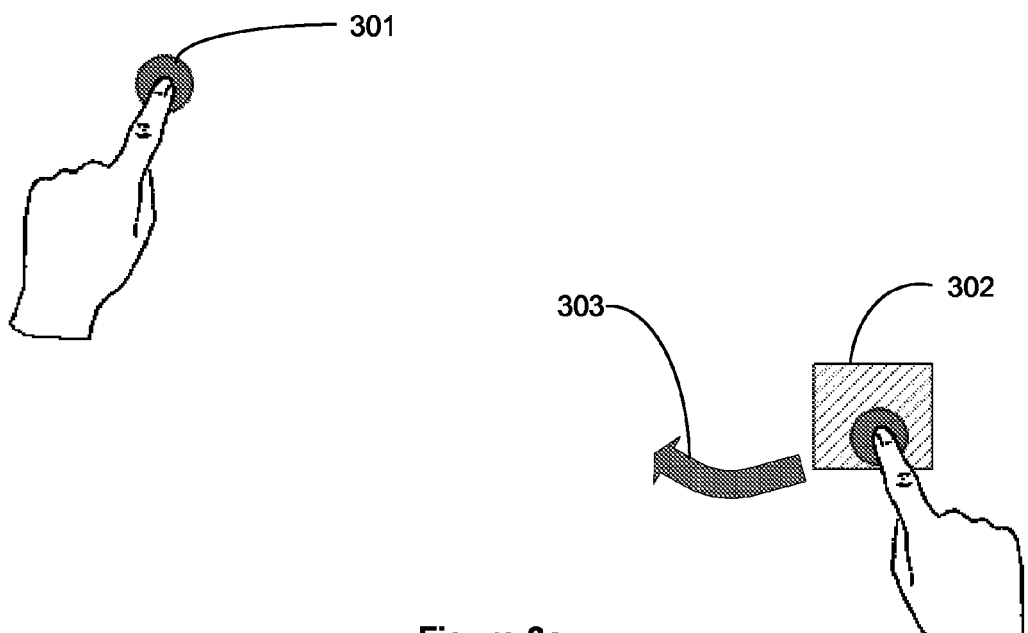
FIGS. 3a-b illustrate an exemplary magnetic toss gesture.
Figure 3B:
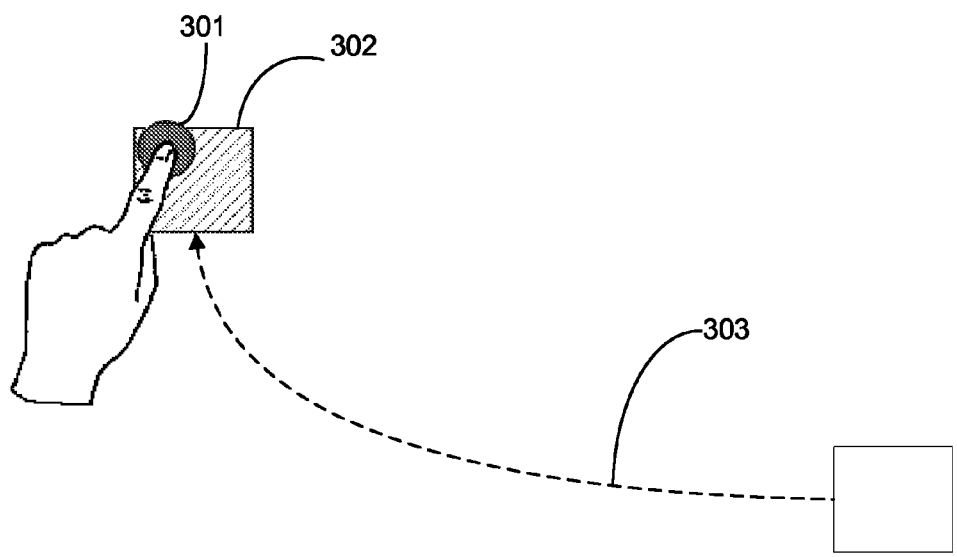

FIGS. 3*a* and 3*b* illustrate an exemplary magnetic toss gesture in accordance with an embodiment. At FIG. 3*a*, a user places, for instance, a first touch at target position 301 associated with a target item, such as a file folder. A second touch may be applied at subject position 302 associated with a subject item, which may be a GUI icon representative of a file.

At FIG. 3*b*, by applying a flicking action 303 by the user's finger at subject position 302 towards target position 301, the file item at subject position 302 may be "tossed" into the file folder at target position 301. Simulated physical effects suitable for incorporation into the GUI display of the motion of subject 302 item towards target position 301 may include a magnetic force of attraction between the target and subject items, the force increasing as the toss action progresses towards completion, or optionally a frictional force to counteract the magnetic attractive force. Suitable audio effects may also be simulated to indicate the progress and completion of the toss, for inclusion into a unified GUI display feedback to the user.

Figure 4A:
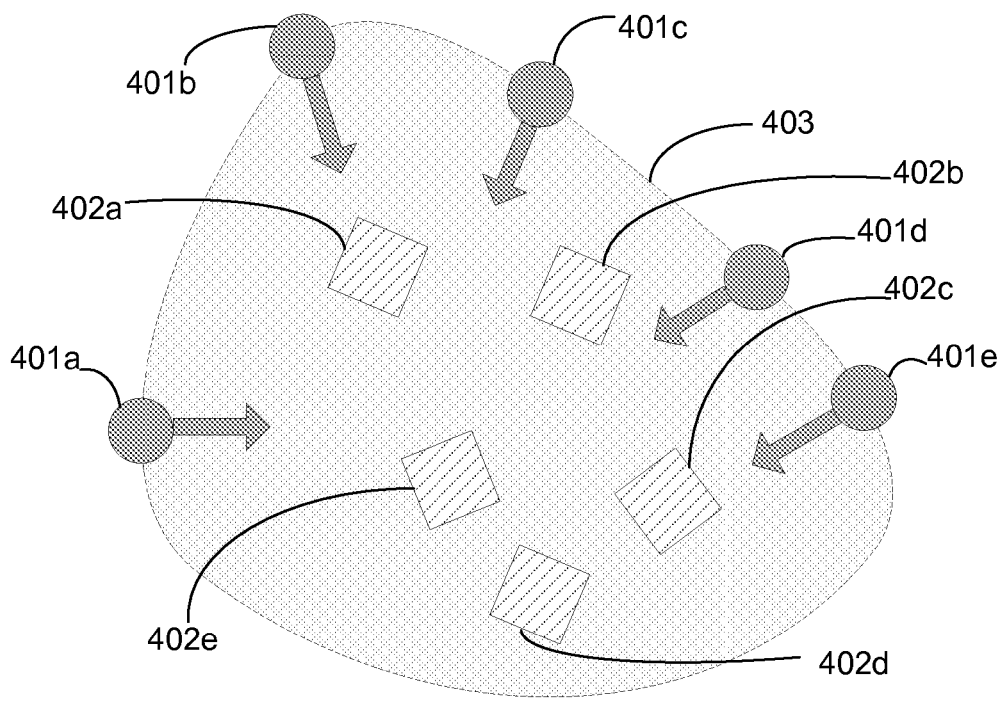
FIGS. 4a-b illustrate an exemplary scrunch gesture.
Figure 4B:
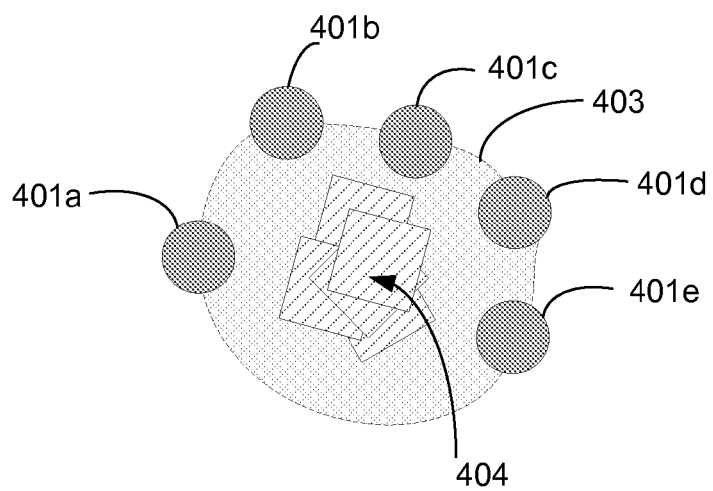

FIGS. 4*a* and 4*b* illustrate an exemplary scrunch gesture in accordance with an embodiment. At FIG. 4*a*, a user's finger touches at positions 401*a-e* may define a bounded region 403 encompassing a set of subject items 402*a-e* therein. During the scrunch gesture, the user's fingers 401*a-e* may close together in order to gather or coalesce the set of subject items 401*a-e* shown on display screen 122 (not shown) during the closing of the user's fingers.

At FIG. 4*b*, as the multipoint touch scrunch gesture is performed, modifications simultaneously occur to the subject items 402*a-e* located within now-coalesced bounded region 403 of the gesture. During this operation, the computing system 100 recognizes the user input as a scrunch gesture, resolves the gesture into a scrunch command, and may optionally determine one or more appropriate physical effect(s), such as a frictional force to counteract the movement of subject items 402*a-e* coalescing into a single pile 404, to associate with the resolved gesture, then outputs the unified feedback action on the display screen 122 (not shown). Also contemplated is reversing the actions of the scrunch gesture, to "unscrunch" a single pile into loosely separate items. For instance, such an "unscrunch" gesture may comprise the reverse order of motions described above for the scrunch gesture, as applied to a tidied group of objects in FIG. 4*b*, which then results in spreading the objects apart to form a FIG. 4*a* type configuration.

Figure 5A:
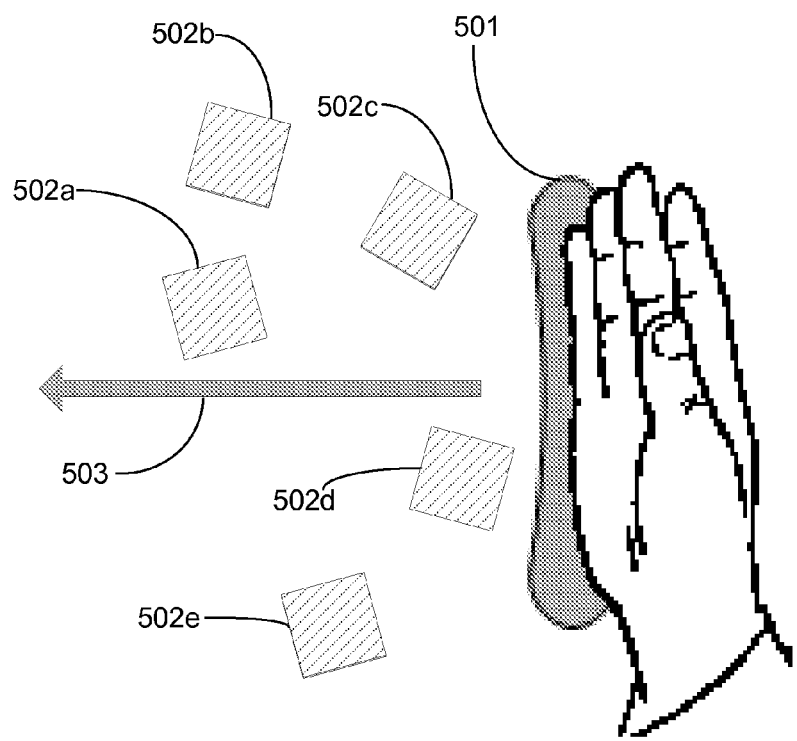
FIGS. 5a-b illustrate an exemplary shove gesture.
Figure 5B:
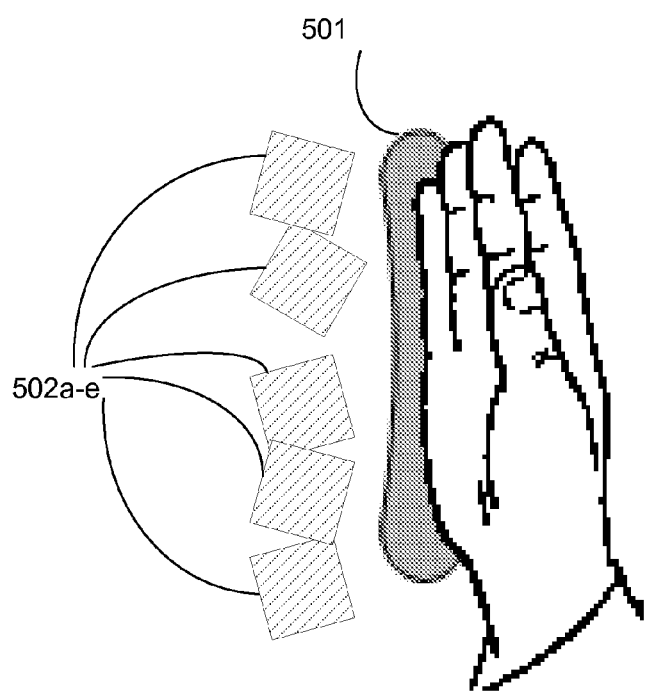

FIGS. 5*a* and 5*b* illustrate an exemplary shove gesture in accordance with an embodiment. At FIG. 5*a*, a user's side-of-the-palm defines a continuous line or region 501. Region 501 may encompass a set of subject items 502*a-e* at least with regard to a given direction 503 therein.

At FIG. 5*b*, during the shove gesture, the user's side of the palm defining region 501 may move in direction 503 to pile together the set of subject items 502*a-e* shown on display screen 122. As the multipoint touch shove gesture is performed, modifications simultaneously occur to the subject items 502a-e located along direction 503 of the gesture. In this gesture, the side of the palm 501 acts as a physical region that collides against the other icons as if they were physical objects. The response to the collision shoves the icons aside with the user's palm. During this operation, the computing system 100 recognizes the user input as a shove gesture, resolves the gesture into a shove command, optionally determines one or more appropriate physical effect(s), such as a frictional force to counteract the movement of subject items 502a-e coalescing, to associate with the resolved gesture, then outputs the unified feedback action on the display screen device 122. The collisions and forces resulting therefrom may be physically simulated.

Figure 6A:
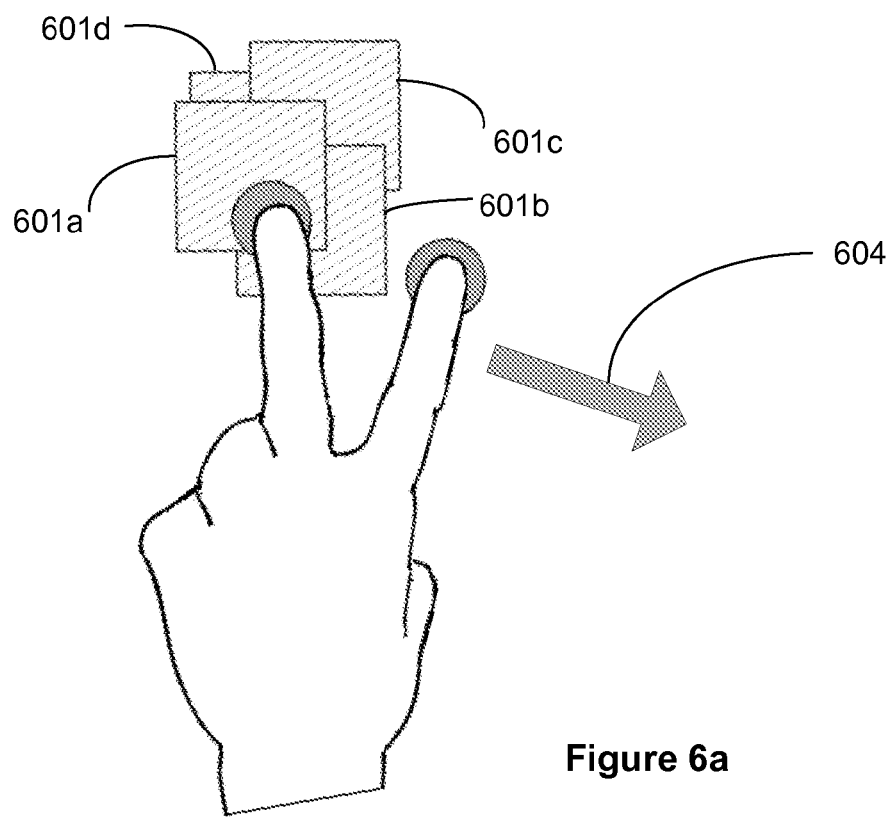
FIGS. 6a-b illustrate an exemplary pile fan-out gesture.
Figure 6B:
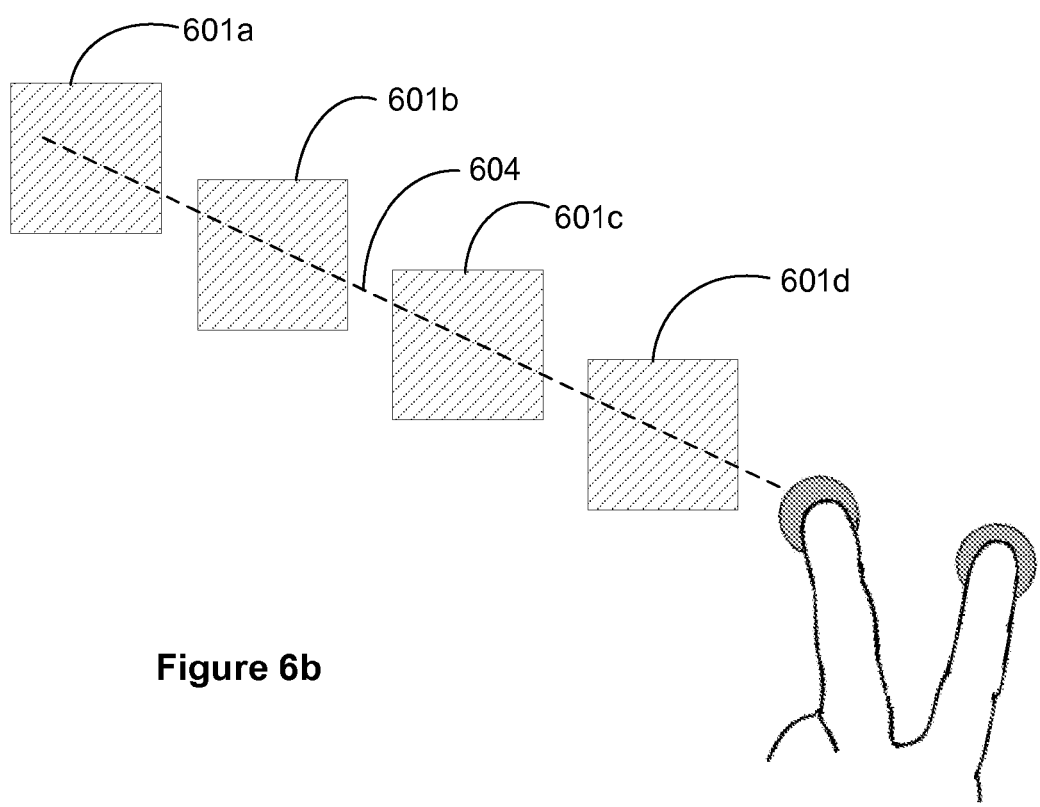

FIGS. 6a and 6b illustrate an exemplary pile fan-out gesture in accordance with an embodiment. At FIG. 6a, the user's fingers are placed on a single pile 601 (not shown) comprised of subject pile items 601a-d. As the two fingers are generally simultaneously dragged along direction 604, modifications simultaneously occur to the subject items 601 a-d that comprise pile 601, showing separately all of items 601a-d of the pile 601.

At FIG. 6b, for example, during the pile fan-out, the computing system 100 recognizes the user input as a pile fan-out gesture, resolves the gesture into a pile-fan-out showing separately all of items 601a-d of the pile 601, optionally determines one appropriate physical effect to simulate, such as a magnetic repulsion or elastic spring force among subject items 601a-d on the line as the pile fan-out progresses, to associate with the resolved gesture, then outputs the unified feedback action on the display screen device 122.

Figure 7A:
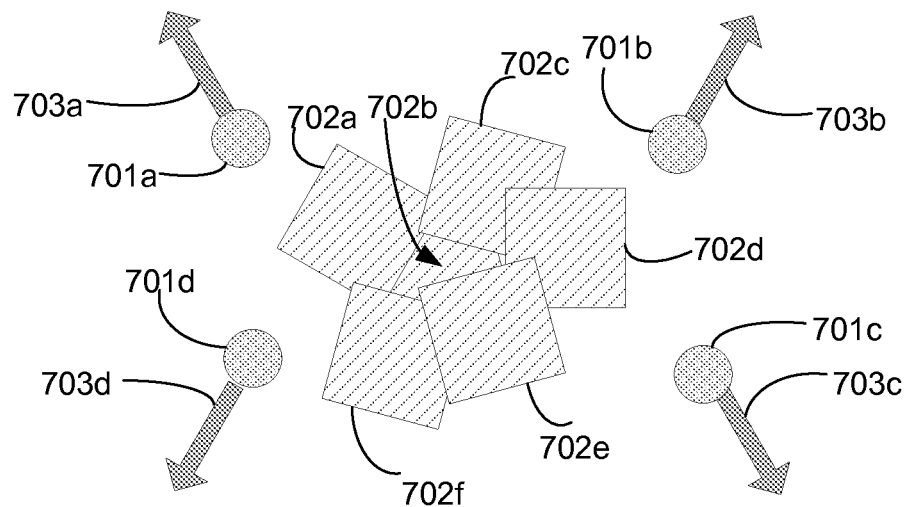
FIGS. 7a-b illustrate an exemplary pile to grid gesture.
Figure 7B:
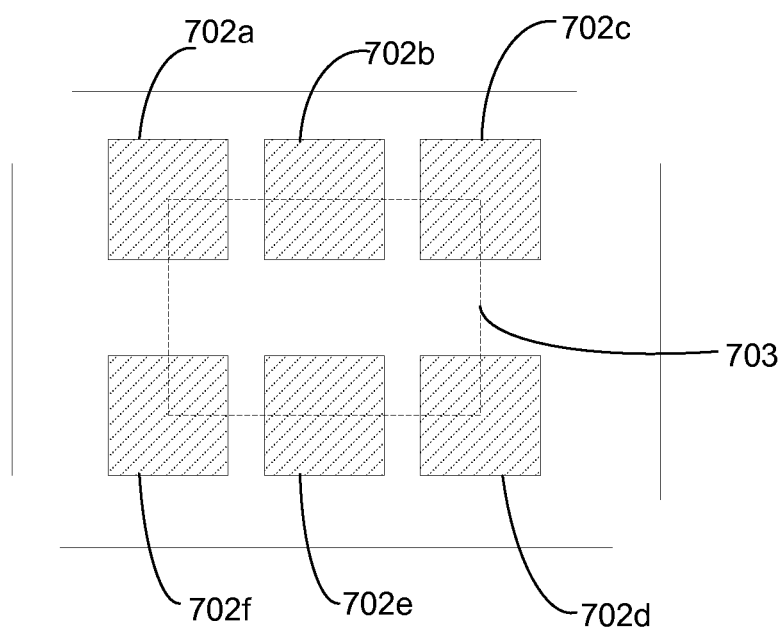

FIGS. 7a-b illustrate an exemplary pile to grid gesture in accordance with an embodiment. At FIG. 7a, a user positions finger touches at generally rectangular touch positions 701a-d encompassing a neat stack or a pile 702 (not shown), pile 702 comprising subject items 702a-f. The touch positions 701a-d are respectively moved continuously outward along respective, disparate directions 703a-d. Modifications simultaneously occur to the subject items 702a-f of pile 702, whereby the size of the rectangle thereby defined expands, causing the separate subject items 702a-f to ordered for display along a grid. During this operation, the computing system 100 recognizes the user input as a pile to grid gesture, resolves the gesture into a pile to grid command, determines one or more appropriate physical effect(s), such as having the objects animate into a grid as if there were magnetic forces propelling them along the grid, to associate with the resolved gesture, then outputs the unified feedback action on the display screen device 122.

Figure 8A:
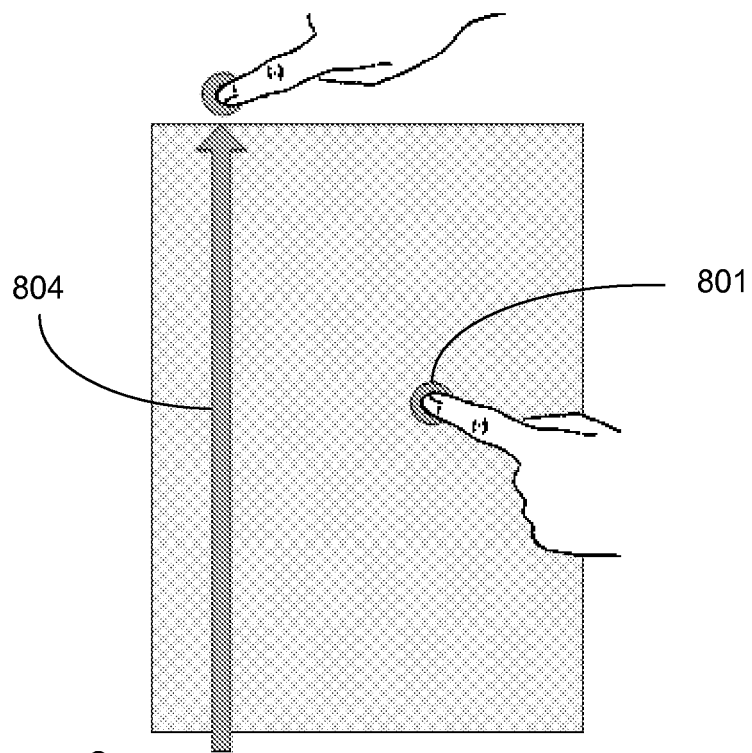
FIGS. 8a-b illustrate an exemplary photo crop gesture.
Figure 8B:
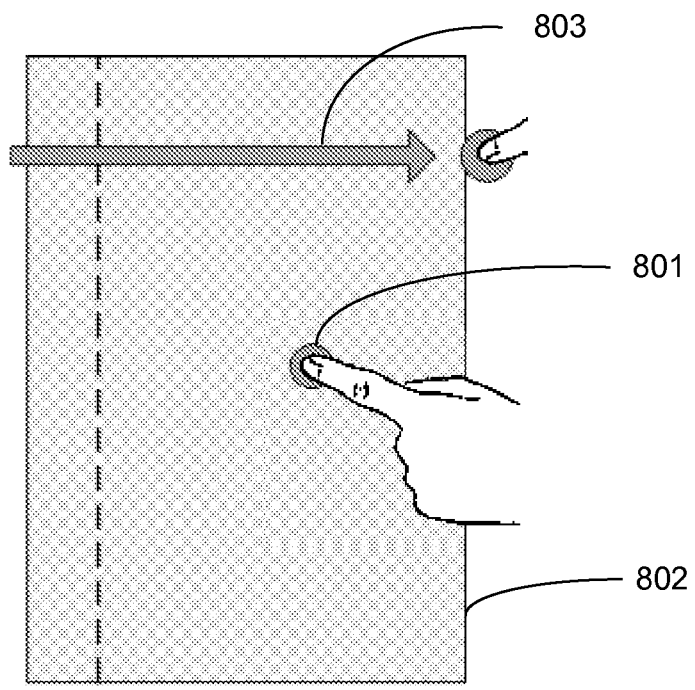

FIGS. 8a-b illustrate an exemplary photo crop gesture in accordance with an embodiment. At FIG. 8a, a first user finger touches first position 801 within photo 802. A second user finger swipes along a horizontal direction defining a top crop line 803. At FIG. 8b, additional crop lines, such as left crop line 804, right, or bottom, can be defined. Releasing the user's first finger from first position 801 completes the photo crop operation. During this operation, the computing system 100 recognizes the user input as a photo crop gesture, resolves the gesture into a photo crop command, determines one or more appropriate physical effect(s) to simulate, such as having the fingers slice/shear the photo as if it were paper and then the cropped piece falling downward/outward with gravity, and to associate with the resolved gesture, then outputs the unified feedback action on the display screen device 122. It will be appreciated that the gesture resolution and visual feedback may be more continuous, rather than processed at the end. For instance, in the photo cropping gesture depicted in FIGS. 8a-b, a line across the photo may show what a user is cropping, and the line is continuously updated as the user drags a finger to draw the line.

Figure 9A:
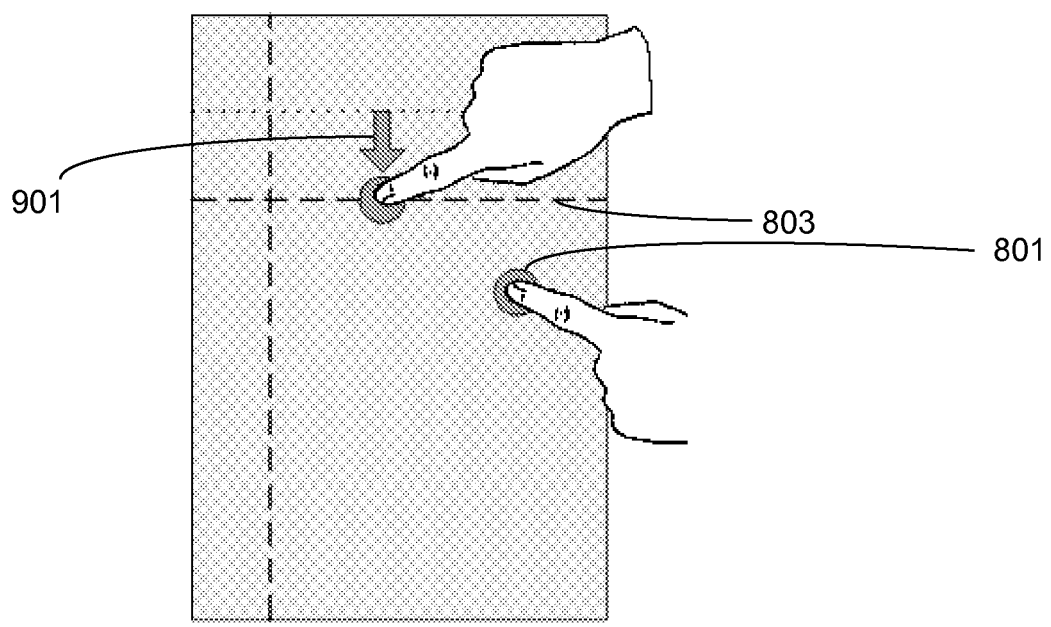
FIGS. 9a-b illustrate an exemplary photo crop adjustment gesture.
Figure 9B:
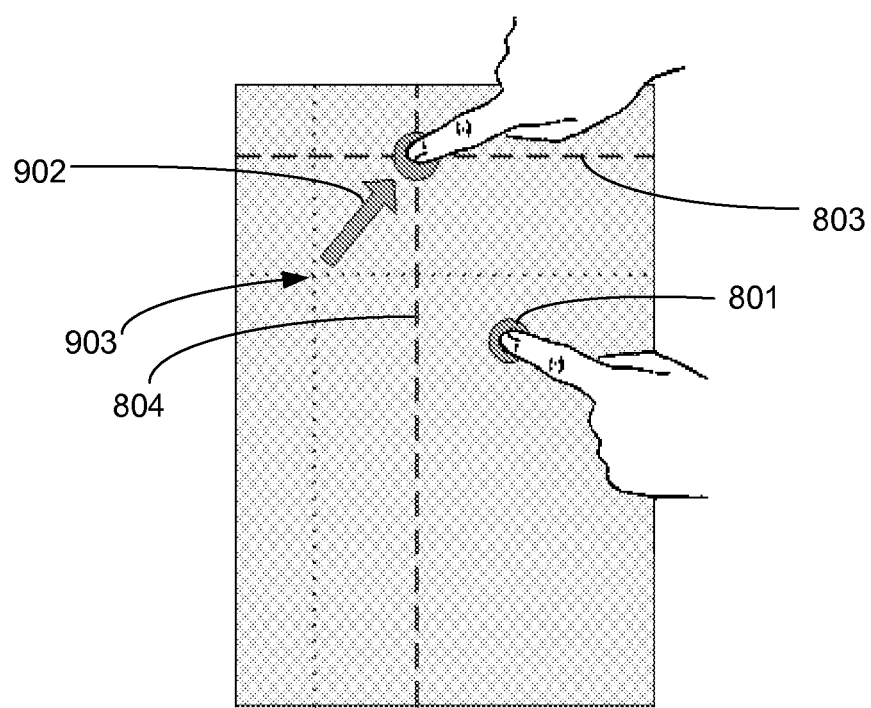

FIGS. 9a-b illustrate an exemplary photo crop adjustment gesture in accordance with an embodiment varying from FIGS. 8a-b. At FIG. 9a, any crop line such as horizontal crop line 803, may be dragged along direction 901 as long as a user's touch remains at first position 801. The crop adjustment is complete once the touch at first position 801 is terminated by lifting.

At FIG. 9b, two crop lines, such as 803 and 804, may be simultaneously adjusted by dragging from their original intersection point 903 along direction 902. Again the adjustment is terminated once the first touch position 801 is lifted.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

Although this disclosure has been described with reference to specific exemplary embodiments, varying modifications thereof will be apparent to those skilled in the art without departing from the scope of the disclosure as defined by the appended claims.

The invention claimed is:

1. A method comprising:
   receiving, by a computing device, an indication of a multipoint touch gesture that is performed with multiple touches at a touch interface;
   determining, by the computing device, at least one physical simulation effect associated with the multipoint touch gesture, wherein the multipoint touch gesture comprises at least one of an unscrunch gesture, a shove gesture, a pile fan-out gesture, a pile-to-grid gesture, and a crop gesture; and
   outputting, by the computing device and for display at a graphical user interface, a unified feedback output action, wherein the unified feedback output action includes applying the at least one physical simulation effect to at least a graphical output action in the graphical user interface.

2. The method of claim 1, wherein the at least one physical simulation effect accounts for one or more spatial attributes of at least one of a subject item and a target item associated with at least the graphical output action.

3. The method of claim 2, wherein rendering the unified feedback output action comprises rendering the unified feedback output action to provide the at least one physical simulation effect as the subject item moves towards the target item in the graphical user interface.

4. The method of claim 2, wherein the one or more spatial attributes comprise at least one of a size attribute, a weight attribute, a mass attribute, and a location attribute.

5. The method of claim 1, wherein the at least one physical simulation effect comprises one or more of a magnetic attraction effect, a magnetic repulsion effect, a friction force effect, a dampening force effect, a centrifugal force effect, an elastic spring force effect, a vibration force effect, a speed effect, an acceleration effect, a brightened level of light effect, and a dimmed level of light effect.

6. The method of claim 5, wherein rendering the unified feedback output action comprises rendering the unified feedback output action to provide the at least one physical simulation effect as a subject item enters into a proximity of a target item in the graphical user interface.

7. The method of claim 1, further comprising associating the resolved multipoint touch gesture with multiple physical simulation effects, and wherein rendering the unified feedback output action comprises combining the multiple physical simulation effects for incorporation with at least the graphical output action.

8. The method of claim 7, wherein combining the multiple physical simulation effects comprises combining a force effect with an audio level effect.

9. The method of claim 1,
   wherein receiving the multipoint touch gesture at the touch interface comprises receiving a toss gesture that includes a first touch applied at a target position associated with a target item and a second touch applied at a subject position associated with a subject item, the toss gesture further including a movement of the second touch applied at the subject position towards the target position,
   wherein resolving the multipoint touch gesture comprises recognizing the toss gesture, and
   wherein at least the graphical output action comprises a movement of the subject item associated with the subject position towards the target item associated with the target position in the graphical user interface.

10. The method of claim 1,
    wherein receiving the multipoint touch gesture at the touch interface comprises receiving a scrunch gesture that includes multiple touches at positions that define a first bounded region encompassing a set of associated subject items displayed in the graphical user interface, the scrunch gesture further including closing of the multiple touches together to define a second bounded region,
    wherein resolving the multipoint touch gesture comprises recognizing the scrunch gesture, and
    wherein at least the graphical output action comprises coalescing the set of associated subject items closer together in the graphical user interface.

11. The method of claim 1,
    wherein receiving the multipoint touch gesture at the touch interface comprises receiving an unscrunch gesture that includes multiple touches at positions that define a first bounded region encompassing a set of associated subject items displayed in the graphical user interface, the unscrunch gesture further including spreading of the multiple touches apart to define a second bounded region,
    wherein resolving the multipoint touch gesture comprises recognizing the unscrunch gesture, and
    wherein at least the graphical output action comprises spreading the set of associated subject items apart in the graphical user interface.

12. The method of claim 1,
    wherein receiving the multipoint touch gesture at the touch interface comprises receiving a shove gesture that includes a side-of-the-palm contact on a continuous region of the touch interface that encompasses a set of associated subject items at least with regard to a given direction, the shove gesture further including movement of the continuous region in the given direction,
    wherein resolving the multipoint touch gesture comprises recognizing the shove gesture, and
    wherein at least the graphical output action comprises moving the set of associated subject items along the given direction in the graphical user interface.

13. The method of claim 1,
    wherein receiving the multipoint touch gesture at the touch interface comprises receiving a pile fan-out gesture that includes multiple touches at one or more positions associated with a pile of subject pile items, the pile fan-out gesture further including movement of the multiple touches in a specified direction,
    wherein resolving the multipoint touch gesture comprises recognizing the pile fan-out gesture, and
    wherein at least the graphical output action comprises fanning out the subject pile items of the pile in the graphical user interface.

14. The method of claim 1,
    wherein receiving the multipoint touch gesture at the touch interface comprises receiving a pile-to-grid gesture that includes multiple touches at positions encompassing an associated pile of subject items, the pile-to-grid gesture further including movement of the multiple touches continuously outward along respective disparate directions,
    wherein resolving the multipoint touch gesture comprises recognizing the pile-to-grid gesture, and
    wherein at least the graphical output action comprises ordering the associated subject items individually along a grid in the graphical user interface.

15. The method of claim 14, wherein the pile-to-grid gesture includes the multiple touches at four positions defining a rectangular region encompassing the associated pile of subject items, the pile-to-grid gesture further including movement of the multiple touches continuously outward along respective disparate directions to expand a size of the rectangular region.

16. The method of claim 1,
wherein receiving the multipoint touch gesture at the touch interface comprises receiving a crop gesture that includes a first touch at a position within a region associated with an object displayed in the graphical user interface, the crop gesture further including movement of a second touch to define a first crop line with respect to the object, and the crop gesture further including a release of the first touch from the position within the region associated with the object,
wherein resolving the multipoint touch gesture comprises recognizing the crop gesture, and
wherein at least the graphical output action comprises cropping the object along the first crop line in the graphical user interface.

17. The method of claim 16,
wherein the crop gesture further includes movement of the second touch to define a second crop line with respect to the object, and
wherein at least the graphical output action further comprises cropping the object along the second crop line in the graphical user interface.

18. The method of claim 17,
wherein the crop gesture further includes movement of the second touch in a specified direction from a position associated with the first or second crop line without releasing the first touch, and
wherein at least the graphical output action further comprises dragging the respective first or second crop line along the specified direction.

19. The method of claim 17,
wherein the crop gesture further includes movement of the second touch in a specified direction from a position associated with an intersection point of the first and second crop lines, and
wherein at least the graphical output action further comprises dragging both the first and second crop lines from the intersection point along the specified direction.

20. The method of claim 1, wherein the graphical user interface is part of the touch interface.

21. The method of claim 1, wherein the multipoint touch gesture comprises one or more successive single gestures.

22. The method of claim 1, wherein the multipoint touch gesture comprises multiple gestures that occur simultaneously.

23. A computer-readable storage medium comprising instructions that, when executed, cause one or more processors to:
receive an indication of a multipoint touch gesture that is performed with multiple touches at a touch interface;
determine at least one physical simulation effect to associate with the resolved multipoint touch gesture, wherein the multipoint touch gesture comprises at least one of an unscrunch gesture, a shove gesture, a pile fan-out gesture, a pile-to-grid gesture, and a crop gesture; and
output, for display at a graphical user interface, a unified feedback output action, wherein the unified feedback output action includes applying the at least one physical simulation effect to at least a graphical output action in the graphical user interface.

24. A computing device comprising:
a touch interface to receive a multipoint touch gesture that is performed with multiple touches at the touch interface;
a processor;
a physical simulation module implemented by the processor to determine at least one physical simulation effect associated with the multipoint touch gesture, wherein the multipoint touch gesture comprises at least one of an unscrunch gesture, a shove gesture, a pile fan-out gesture, a pile-to-grid gesture, and a crop gesture; and
wherein the multipoint input interface is configured to output a unified feedback output action in a graphical user interface, wherein the unified feedback action includes applying the at least one physical simulation effect to at least a graphical output action in the graphical user interface.

* * * * *